US010214236B2

(12) United States Patent
Jaramillo-Moscoso

(10) Patent No.: US 10,214,236 B2
(45) Date of Patent: Feb. 26, 2019

(54) SELECTIVELY DEPLOYABLE CONTROL DEVICE

(71) Applicant: Jaguar Land Rover Limited, Coventry (GB)

(72) Inventor: Gustavo Jaramillo-Moscoso, Coventry (GB)

(73) Assignee: Jaguar Land Rover Limited, Coventry, Warwickshire (GB)

(*) Notice: Subject to any disclaimer, the term of this patent is extended or adjusted under 35 U.S.C. 154(b) by 0 days.

(21) Appl. No.: 15/301,776

(22) PCT Filed: Apr. 1, 2015

(86) PCT No.: PCT/EP2015/057242
§ 371 (c)(1),
(2) Date: Oct. 4, 2016

(87) PCT Pub. No.: WO2015/155101
PCT Pub. Date: Oct. 15, 2015

(65) Prior Publication Data
US 2017/0183033 A1    Jun. 29, 2017

(30) Foreign Application Priority Data
Apr. 11, 2014    (GB) .................................. 1406543.7

(51) Int. Cl.
*B62D 13/06*    (2006.01)
*B60K 35/00*    (2006.01)
(Continued)

(52) U.S. Cl.
CPC .............. *B62D 13/06* (2013.01); *B60K 35/00* (2013.01); *B60K 37/06* (2013.01); *B60R 1/00* (2013.01);
(Continued)

(58) Field of Classification Search
CPC ...... B62D 13/06; B62D 1/22; B62D 15/0275; B62D 15/0295; B60R 1/00;
(Continued)

(56) References Cited
U.S. PATENT DOCUMENTS 2,070,832 A    5/1935    Johnson
5,086,510 A    2/1992    Guenther et al.
(Continued)

FOREIGN PATENT DOCUMENTS

DE            103 46 888 A1    5/2005
DE    10 2005 043 467 A1    3/2007
(Continued)

OTHER PUBLICATIONS

Combined Search and Examination Report, GB Application No. 1406543.7, dated Oct. 14, 2014, 9 pages.
(Continued)

Primary Examiner — Richard A Goldman
(74) Attorney, Agent, or Firm — Myers Bigel, P.A.

(57) ABSTRACT

A vehicle (100) comprises a docking port and a selectively demountable switch (10) having a body and a rotary knob (40) on the body, and an interface between the switch and the docking port to enable commands entered by operation of the rotary knob to be communicated to the vehicle (100). The vehicle (100) incorporates a tow-assist system to facilitate reversing of a trailer, the vehicle (100) being of the type having a positive power-assisted steering mechanism (350) for its steerable wheels (250). The system comprises computing means (310) and the demountable switch (10). The computing means (350) is arranged to interpret rotational movement of the knob (40) on the body as desired steering movements of the trailer when the vehicle (100) is being reversed and to effect steering commands for the positive (Continued)

power assisted steering mechanism (350) to achieve said desired steering movements of the trailer.

12 Claims, 2 Drawing Sheets

(51) Int. Cl.
| | |
|---|---|
| *B60K 37/06* | (2006.01) |
| *B62D 15/02* | (2006.01) |
| *B60W 30/06* | (2006.01) |
| *B60W 30/18* | (2012.01) |
| *B62D 1/00* | (2006.01) |
| *B60R 1/00* | (2006.01) |
| *B62D 1/22* | (2006.01) |

(52) U.S. Cl.
CPC ...... *B60W 30/06* (2013.01); *B60W 30/18036* (2013.01); *B62D 1/00* (2013.01); *B62D 1/22* (2013.01); *B62D 15/027* (2013.01); *B62D 15/0275* (2013.01); *B60K 2350/102* (2013.01); *B60K 2350/355* (2013.01); *B60K 2350/925* (2013.01); *B60K 2350/941* (2013.01); *B60K 2350/946* (2013.01); *B60K 2350/948* (2013.01); *B60R 2300/806* (2013.01); *B60R 2300/808* (2013.01); *B60W 2300/14* (2013.01); *B60W 2520/22* (2013.01); *B60W 2710/207* (2013.01); *B60Y 2200/147* (2013.01)

(58) Field of Classification Search
CPC .......... B60R 2300/806; B60R 2300/14; B60K 2350/1008; B60K 2350/102; B60W 30/06; B60W 30/18036; B60Y 2200/147; B60N 3/103
USPC ...................... 701/41; 340/431; 180/315, 321
See application file for complete search history.

(56) References Cited

U.S. PATENT DOCUMENTS

| | | | | |
|---|---|---|---|---|
| 5,161,422 A * | 11/1992 | Suman | .................... | B60K 20/04 |
| | | | | 180/315 |
| 5,307,891 A | 5/1994 | Shaw et al. | | |
| 6,360,149 B1 | 3/2002 | Kwon et al. | | |
| 2001/0045774 A1* | 11/2001 | Rode | .................... | B60N 2/0248 |
| | | | | 307/9.1 |
| 2006/0103511 A1* | 5/2006 | Lee | ........................ | B62D 5/008 |
| | | | | 340/431 |
| 2008/0019082 A1* | 1/2008 | Krieger | ............... | B60R 11/0241 |
| | | | | 361/601 |
| 2008/0079388 A1* | 4/2008 | Sarnowsky | ........... | H02J 7/0042 |
| | | | | 320/103 |
| 2009/0292851 A1* | 11/2009 | Mead | .................... | G06F 1/1632 |
| | | | | 710/303 |
| 2010/0308092 A1* | 12/2010 | Schrock | ................. | B60N 3/101 |
| | | | | 224/400 |
| 2012/0185131 A1* | 7/2012 | Headley | ................. | B60D 1/245 |
| | | | | 701/41 |
| 2012/0271512 A1* | 10/2012 | Rupp | ..................... | B62D 13/06 |
| | | | | 701/41 |
| 2012/0271514 A1* | 10/2012 | Lavoie | ........... | B60W 30/18036 |
| | | | | 701/42 |
| 2012/0271515 A1* | 10/2012 | Rhode | .................... | B62D 13/06 |
| | | | | 701/42 |
| 2012/0271522 A1* | 10/2012 | Rupp | ..................... | B62D 13/06 |
| | | | | 701/70 |
| 2012/0298708 A1* | 11/2012 | DeAngelo | .............. | B60N 3/103 |
| | | | | 224/567 |
| 2013/0221981 A1* | 8/2013 | Miller | .................. | G01R 31/043 |
| | | | | 324/538 |
| 2013/0268160 A1* | 10/2013 | Trombley | .............. | B62D 13/06 |
| | | | | 701/42 |
| 2013/0321634 A1* | 12/2013 | Okano | ..................... | B60R 1/00 |
| | | | | 348/148 |
| 2014/0058614 A1 | 2/2014 | Trombley et al. | | |
| 2015/0251693 A1* | 9/2015 | Lavoie | .................. | B62D 13/06 |
| | | | | 701/41 |
| 2015/0251697 A1* | 9/2015 | Lavoie | .................. | B62D 13/06 |
| | | | | 701/523 |
| 2016/0257341 A1* | 9/2016 | Lavoie | .................. | B62D 13/06 |
| 2017/0183033 A1* | 6/2017 | Jaramillo-Moscoso | ..................... | |
| | | | | B62D 13/06 |

FOREIGN PATENT DOCUMENTS

| | | |
|---|---|---|
| DE | 10 2007 017 509 A1 | 10/2008 |
| EP | 0 479 735 A1 | 4/1992 |
| EP | 1 004 230 A2 | 5/2000 |
| GB | 2 344 157 A | 5/2000 |
| JP | 2002-248959 A | 9/2002 |
| JP | 2004-338634 A | 12/2004 |
| JP | 2006-062527 A | 3/2006 |
| JP | 2011-152830 A | 8/2011 |
| WO | WO 2007/034597 A1 | 3/2007 |
| WO | WO 2013/003866 A2 | 1/2013 |

OTHER PUBLICATIONS

Combined Search and Examination Report, GB Application No. 1406543.7, dated Apr. 16, 2015, 3 pages.

Notification of Transmittal of the International Search Report and the Written Opinion of the International Searching Authority, or the Declaration, PCT/EP2015/057242, dated Dec. 9, 2015, 17 pages.

* cited by examiner

SELECTIVELY DEPLOYABLE CONTROL DEVICE

RELATED APPLICATIONS

This application is a 35 U.S.C. § 371 national stage application of PCT Application No. PCT/EP2015/057242, filed on Apr. 1, 2015, which claims priority from Great Britain Patent Application No. 1406543.7filed on Apr. 11, 2014, the contents of which are incorporated herein by reference in their entireties. The above-referenced PCT International Application was published in the English language as International Publication No. WO 2015/155101 A2 on Oct. 15, 2015.

TECHNICAL FIELD

The present disclosure relates to a selectively deployable control device. In particular, but not exclusively, it relates to a control device for operating functions of a vehicle, for example a reversing assistance system for use with a vehicle towing a trailer. Aspects of the invention relate to a vehicle, to a method, to a system and to a switch.

BACKGROUND

Towing trailers using a vehicle is straightforward until it is necessary to reverse the vehicle. Operating in reverse a vehicle towing a trailer is a skill that must be learned. It is counter-intuitive because to turn the trailer to the left (when facing rearwardly) it is necessary first to turn the rear of the vehicle towing (or pushing in this case) the trailer to the right, which in turn means steering to the right to make the front of the vehicle move to the left. That is opposite to the direction of turning the steering wheel if the driver wanted to position the rear of the vehicle to the left in normal reversing without a trailer. Moreover, the direction of turn of the steering wheel soon needs to change, otherwise the trailer is apt to jack-knife with respect to the pushing vehicle. Because such reversing of a trailer is not frequently required, it is a skill that is not widely practiced, and therefore is not easily learned. It challenges many drivers and may even be a cause in some cases of a user choosing not to employ a vehicle with a trailer at all, but instead to acquire a larger vehicle that has the carrying capacity of a normal car and trailer without the need for a trailer.

Nevertheless, the technique for reversing a trailer is well understood and can be calculated and computed relatively easily when certain parameters are known, the most important being the geometry of the vehicle and trailer wheel bases. Indeed, the technology exists that can take over entirely the steering of a reversing trailer, provided the desired position and direction required of the trailer is known.

Tow-assist technology is known. There are two current options. A first provides a simple rear-facing camera and an in-cockpit screen on which the video image captured by the camera is displayed. When in tow-assist mode, and the vehicle is put into reverse gear (and knowing the geometry of the vehicle and the distance of the trailer axle from a towing hook), a computing system calculates the path a trailer will follow with a given (the current) steering input and displays it on the screen. The driver then needs to change the steering commands as the vehicle progresses in order to maintain a desired path. In this instance, for example, an initial right turn position of the steering wheel may be reflected by a left path for the trailer.

That may be as desired, but as the turn proceeds, if no change is made to the steering wheel, it is likely that the indicated path of the trailer will "tighten" rapidly. The driver needs to know that the steering must to be straightened to reduce the degree of turn of the trailer. The vehicle is at all times in the control of the driver.

The second option is to place into the video image the desired path to be taken by the trailer (for example by manipulating virtual tram lines in the image, or indeed by indicating an ultimate desired parking position in the image) and then leave the vehicle to steer itself appropriately under control of a computer algorithm, the driver merely operating the accelerator and brake and monitoring progress, releasing the steering wheel to be operated by the vehicle.

The latter system obviously involves positive power-assisted steering. That is, not merely amplification of steering movements implemented by the driver's actuation of a steering wheel, but initiation of steering movements under computer control. This is the first stage of steering-by-wire. However, complete steering-by-wire (that is, disconnection of a physical link between a steering wheel and the vehicle wheels to be steered) is not currently a practical arrangement (in the sense of being publicly or legally acceptable or permissible).

This system requires an interface between the driver and vehicle to input desired trailer trajectory, path or position instructions. In steering-by-wire, it would be feasible to use the vehicle steering wheel, because this could be disconnected from normal vehicle steering mode during trailer reversing. Aspects of the present invention provide such an arrangement. However, this is not going to be available unless and until steering-by-wire becomes a viable option in vehicles generally.

Nevertheless, whatever arrangement is provided for inputting commands for assisted reversing of a vehicle towing a trailer, it will always be a relatively rare occurrence to use those arrangements. Providing in-built controls for that purpose is somewhat excessive, particularly given the plethora of other controls already to be catered for; the "real estate" of a vehicle's dashboard and centre console (where control elements for a driver are typically located) is already crowded with functionality.

Some vehicle manufacturers have elected to use touch-screens and the like for both providing on-board information to the vehicle occupants as well as enabling input to the vehicle's control systems. Such screens work very well. However, other vehicle manufacturers employ more physical devices and indeed rotary knobs that are certainly better suited for some kinds of control than are touch screens. The reasons for this are multifarious and one advantage is the lack of necessity to watch the control while it is being operated. Steering control is one example where a rotary knob is potentially superior, since the driver can watch the surroundings while accurately inputting steering commands. Some rotary knobs are multi-modal. That is, they can operate different controls simply by selecting a particular function. This may be achieved by moving the position of the knob (e.g. axially) so that it engages different control elements of the knob. Alternatively, the knob may be universal having no endstops (that is, it may be rotated infinitely) and it is only a degree of rotation from a current position that is detected by the system it is operating, which may be switched between different functions by operation of other switches. The latter is not always desirable since there is no feedback that an end position has been reached.

It is an object of the present invention to provide a system that addresses the above issues and at least mitigates some of the problems discussed.

SUMMARY OF THE INVENTION

Aspects of the invention provide a vehicle, a method, a system or a switch as claimed in the appended claims.

In accordance with another aspect of the present invention there is provided a vehicle comprising a docking port and a selectively demountable switch comprising a body having a rotary knob and an interface between the switch and the docking port to enable commands entered by operation of the rotary knob to be communicated to the vehicle.

The term "switch", as used herein, unless the context otherwise dictates, is intended to cover any device adapted or configured to switch a control function from one condition to one or more alternative conditions.

The docking port may physically restrain the switch body when docked with the docking port. In one embodiment the docking port comprises a cup holder. The cup holder may be disposed in a centre console of the vehicle, which console is disposed between a driver's seat and a front passenger seat of the vehicle.

The interface may comprise a physical coupling comprising a plug and socket.

Interengagement between the plug and socket may be effected by a docking operation between the demountable switch and docking port. Optionally, said docking operation is a two-part movement comprising an insertion step and an engagement step, wherein during the insertion step the switch is moved into a docking position between said switch and port and during the engagement step, after performance of the insertion step, an element of the switch or port is actuated to lock the switch in the port and also to mutually engage said plug and socket.

Said engagement of the plug and socket may be completed by a magnetic connection between the plug and socket that corrects a degree of misalignment between said plug and socket after performance of said insertion step. Preferably, a signal indicates successful docking of the switch with the docking port, such as illumination of the rotary knob.

Alternatively, the interface may be a wireless coupling. When docked, the docking port may provide electrical power to the switch wirelessly.

Alternatively, said docking may be remotely effected, not requiring physical proximity between the switch and docking port, in which event the switch is independently powered and communicates with the docking port using acoustic or radio communication, for example infrared.

In one embodiment, the switch provides an input interface for a tow-assist system of the vehicle, which vehicle has positive power-assist steering, whereby operation of the rotary knob provides the tow-assist system with desired direction indications of a trailer connected to the vehicle during reversing of the vehicle and the tow-assist system controls steering of the vehicle.

In this way, a driver of the vehicle uses the rotary knob as a substitute steering wheel to steer the reversing trailer and vehicle as if the trailer wheels were physically being steered. The tow-assist system interprets the rotary knob instructions (rotational movements of the knob) and effects actual steering movements of the vehicle's steered wheels (actuating the positive power-assist steering) to achieve the desired steering effect of the trailer.

Having the switch demountable means that it can be kept separately, in a suitable storage compartment of the vehicle and so that it can be deployed as and when required, which is always only going to be occasional, at least in the circumstances of its application as a tow-assist reversing instruction input device.

Indeed, in the embodiment where the docking port is a cup holder (generally an existing feature of a vehicle) it is usually disposed in a convenient location for the driver to access. For example, when in a centre console position, a driver may turn around in his or her seat to watch where the vehicle and trailer is heading in reverse, and employ the knob disposed in the centre console cup-holder more easily than operating the steering wheel. Whereas, when it is not being used, the demountable switch may be kept in a glove compartment or the like, enabling the cup holder to be employed for its normal function.

However, the invention also conceives that the demountable switch may be quite independent of the vehicle, and docks virtually and communicates wirelessly. In that way, a feature of the invention in its tow-assist application is that it may be employed outside of the vehicle. This embodiment requires the vehicle to have an automatic gearbox that can be have reverse gear selected and then control switched to the demountable switch. In this event, the switch will not only have the rotary knob but also other switches or buttons that, in the presently envisaged scenario, will instruct at least "Go" and "Stop" modes of the vehicle.

Thus, once control is switched in the vehicle to the demountable switch, the driver may exit the vehicle and instigate "Go", whereupon the tow-assist system would proceed to reverse the vehicle slowly and receive direction instructions from the demountable switch. The driver would steer the demountable switch as if steering the wheels of the trailer, with a view to reversing the trailer to a desired end position. The tow-assist system would interpret the instructions and effect the requisite steering movements of the wheels actually steering the vehicle-trailer combination, generally the front wheels of the vehicle. The driver would be able to monitor the progress of the operation with good views around the vehicle and ensure safety.

In another aspect, the invention provides a tow-assist system for a vehicle and trailer, the vehicle being of the type having a positive power-assisted steering mechanism, the system comprising computing means and a demountable switch having a body, a rotary knob on the body and an interface for the communication with the computing means, wherein the computing means is arranged to interpret rotational movement of the knob on the body as desired steering movements of the trailer and effect steering commands for the positive power assisted steering mechanism to achieve said desired steering movements of the trailer.

Of course, "achieving said desired steering movements of the trailer" does not mean an exact reproduction of the movement of the trailer that would be achieved if the trailer's wheels were in fact steerable, and steered by the rotary knob. The reason for this is simple. Such movements cannot be precisely reproduced by steering wheels on a different axle. However, the skilled person understands that achieving an approximation of the steering movements is all that is required. Indeed, to that end, it is desirable, but not essential, that the tow-assist system further comprises a camera and a display to display the image captured by the camera, wherein the camera is intended for disposition on the vehicle or trailer to face rearwardly and to display on the image indications of the route the trailer will follow with a current steering input to the rotary knob.

In one embodiment, the body is shaped to fit a cup-holder of a vehicle for which it is intended and comprises plug and socket interface for engagement with a corresponding plug and socket interface in the vehicle.

In another aspect, the invention provides a demountable switch for a tow-assist system of a vehicle, comprising a body, a rotary knob on the body, and a selectively engageable interface to enable commands entered by operation of the rotary knob to be communicated to vehicle having a corresponding interface. The body may be cup-shaped. The interface of the switch may comprise a plug adapted to be deployed by movement of an element of the switch to engage said plug with a corresponding socket of a vehicle. Indeed, the switch may have the features defined above with respect to a vehicle according to the invention as defined above.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention are further described hereinafter with reference to the accompanying drawings, in which.

DETAILED DESCRIPTION

Figure 1:
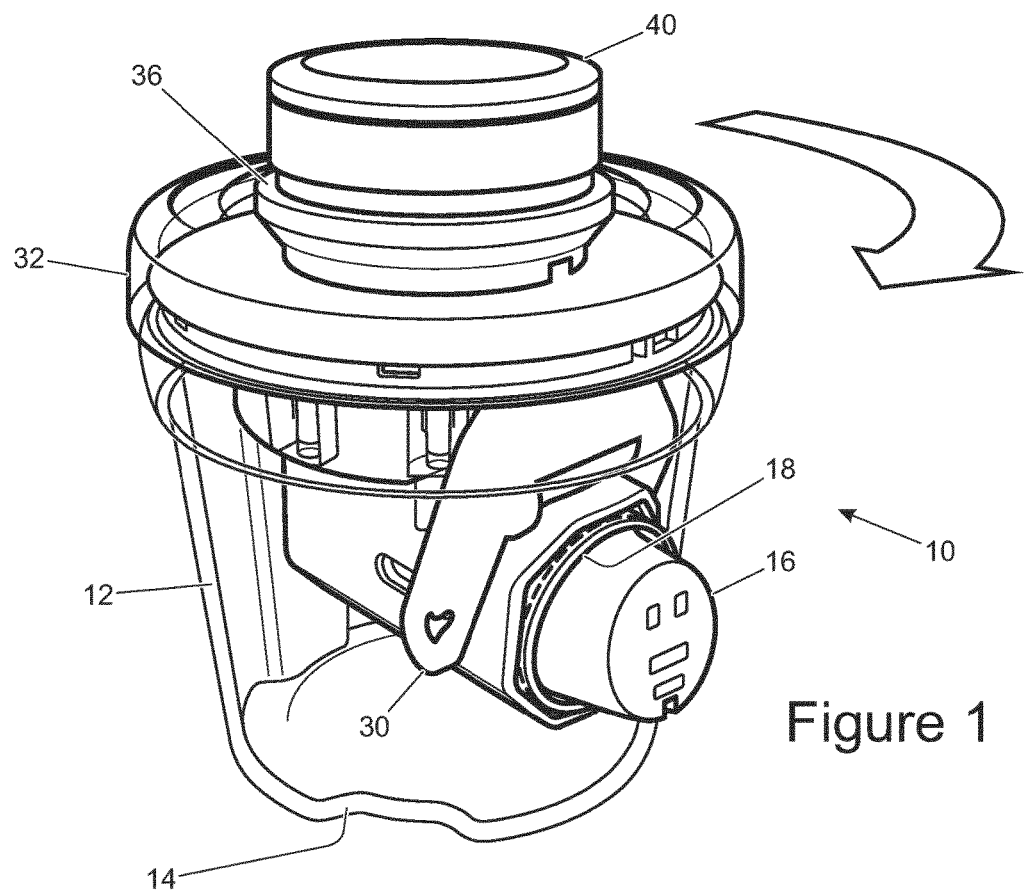
FIG. 1 is a perspective schematic view of a demountable switch in accordance with an embodiment of the invention.
Figure 2:
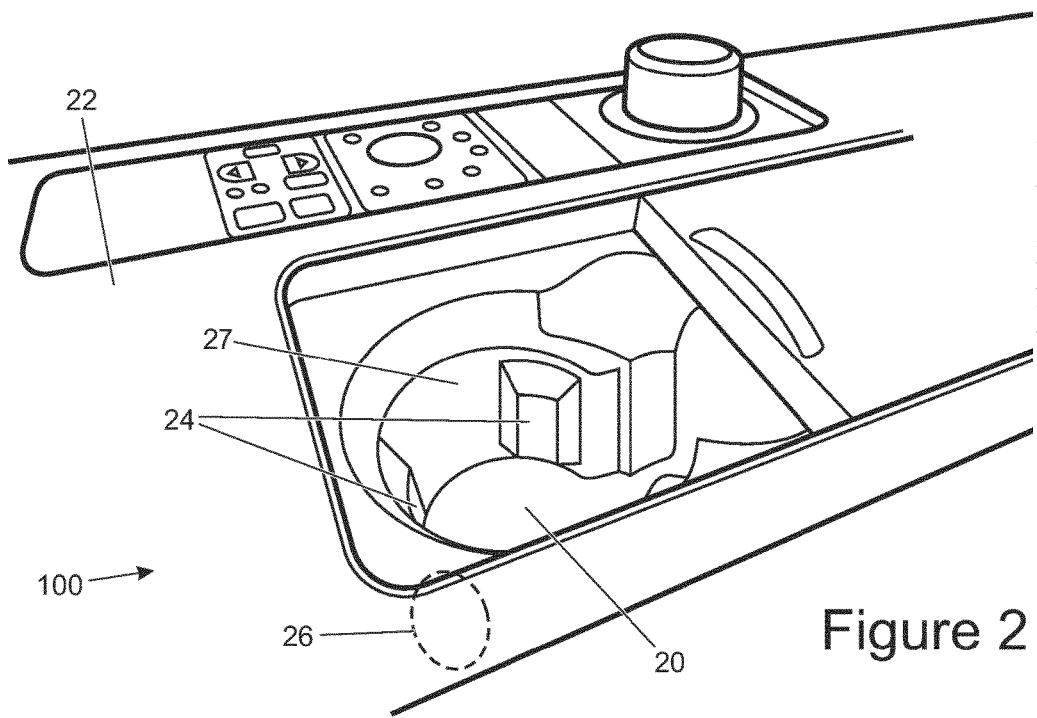
FIG. 2 is a perspective view of a centre console of a typical vehicle.

In the drawings, a demountable switch 10 has a cup-shaped body 12 designed to fit in a cup-holder 20 in a centre console 22 of a vehicle 100. The body has grooves 14 adapted to mate with corresponding ridges 24 in the cup holder. In that way, the orientation of the switch 10 can be matched to the cup-holder when inserted in the cup-holder.

The cup-holder is provided with a socket 26 that connects to a wiring loom (not shown) of the vehicle. Typically, tow-assist systems are part of, or are incorporated in, a camera fixed to the rear of a vehicle, also connected to the wiring loom. However, the invention is not limited to such an arrangement and indeed the specific type of tow-assist provided is incidental to the invention.

Positive power-assisted steering is generally effected electrically by an electric motor connected to the vehicle's steering rack. The motor is generally also connected to the wiring loom and is controlled by its own control system capable of receiving command inputs, potentially not only from movements of the steering wheel effected by the driver, but also by other systems such as a tow-assist system.

Whether the vehicle incorporates a tow-assist system, and what type of tow-assist system is installed, does not necessarily impact the provision of the socket 26 in the cup-holder 20. In vehicles not incorporating such a system, the socket 26 is merely unused and/or the wiring loom does not include connections therefor. However, the provision of the demountable switch only has application where the socket is connected to the vehicle's wiring loom and to the tow-assist system installed in the vehicle. On the other hand, it is to be anticipated that, where the tow-assist system is installed in a camera, a vehicle could be retro-fitted with the tow-assist system despite the wiring loom already having the requisite connections.

When the switch 10 is to be installed, a plug 16 is withdrawn from the position shown in FIG. 1 where it protrudes through an aperture 18 from the surface of the body. A mechanism comprising a cam 30 is operated by rotation of a collar 32 pulling the plug 16 within the confines of the body 12. In this position a first, insertion step may be effected by disposing the switch 10 in the cup-holder 20. The tapering of the body 12 and walls 27 of the cup-holder 20 ensure axial alignment between the two, whereas the ridges/grooves 24, 14 ensure rotational alignment between the two. It may be that the ridges/grooves are evenly spaced, for example on 120° angles around the axis of the switch/cup-holder. In that event, deployment of the plug 16 will not be successful except in the one position where the plug aligns with the socket 26. Alternatively, the ridges/grooves could be "keyed" in the sense that the angle between, or the widths of, the ridges/grooves may be unevenly distributed around the body of the switch 10 so that the body 12 only fits in the cup-holder 20 in the angular position that does align the plug 16 with the socket 26.

Thereafter, in an engagement step, rotation of the collar 32 pivots cam 30 to project the plug 16 from the window 18 in the body 12. The plug enters the socket 26 and, preferably, a magnetic link snaps the plug into precise engagement with the socket making the requisite electrical connections. Optionally (but not essentially) a light 36 illuminates around knob 40 on the body 12 to confirm correct installation of the switch 10 in the cup-holder 20.

The knob 40 is a rotary knob and, when rotated, its position is detected and electrical signals are emitted and passed to the wiring loom of the vehicle through the plug and socket connection.

The embodiment illustrated in the drawings is, however, just one arrangement. Another embodiment (not illustrated) may involve a physical placement of the switch at a specific docking location, with physical retention, but not requiring any electrical contact beyond a wireless connection. For example a body equivalent to the body 12 could be box-shaped and fitted with a magnetic coupling to hold it in engagement with a shallow tray. A coil under the tray could provide inductive power to the switch so that movements made of its knob may be communicated to the vehicle.

In a further embodiment, also not illustrated, the demountable switch may be only "virtually" docked, meaning there is no physical docking but only a communication connection, such as a Bluetooth® or other wireless connection. In this event, the demountable switch is self-powered, for example with a battery. Also in this arrangement, if the switch is configured to be docked with the cup-holder (for convenience of location) and therefore still has a cup-shaped body 12 to fit in the centre console cup-holder 20, then the optional keying of the inter-engaging ridges/grooves 24, 14 as mentioned above, would most likely be entirely unnecessary and not be employed.

Figure 3:
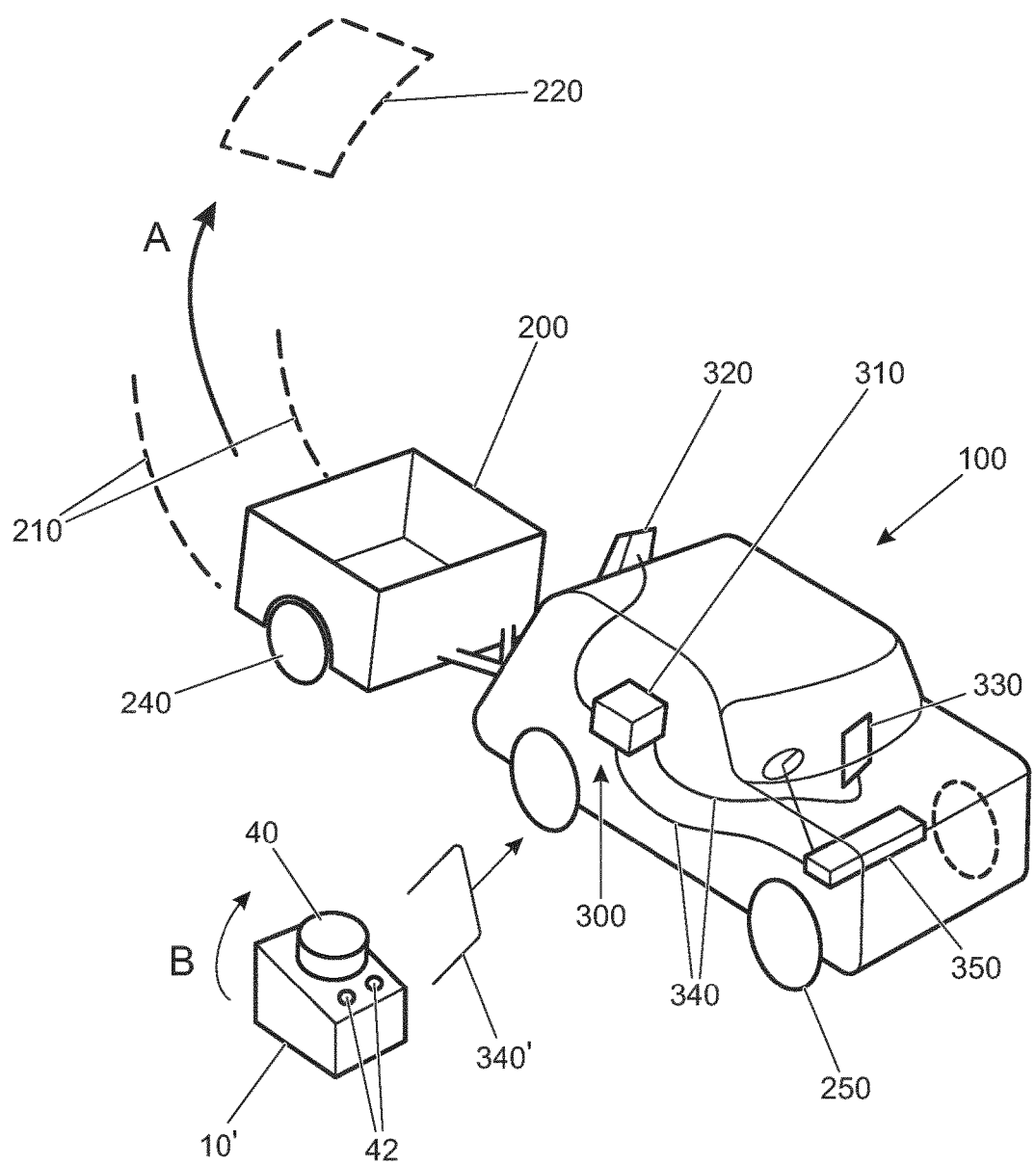
FIG. 3 is a schematic view of a vehicle and trailer and demountable switch in accordance with an embodiment of the invention.

Turning to FIG. 3, a vehicle 100 is shown with a trailer 200 hitched to a towing hook (not visible) at the rear of the vehicle. The vehicle has a tow-assist system generally indicated at 300 and comprising computing means 310 and positive power-assisted steering unit 350. Depending on the type of tow-assist system, it may also comprise rear view camera 320 and on board display 330. All elements are interconnected by communication lines 340 (which could be wireless). The demountable switch 10' also forms part of the system 300 and, in FIG. 3, it is shown as a wireless embodiment, communicating with the computing means via radio or like signals 340'. However, for the purposes of the following explanation (and unless the context dictates otherwise) the switch 10' could be the cup-holder-mountable switch of FIG. 1.

In a first tow-assist mode of operation, the computer 310 is arranged to display the image captured by rear view camera 320 on the display 330. Suppose the driver wishes to reverse the trailer 200 in the direction of the arrow A. Then, by operating the demountable switch knob 40, tram lines 210 may be superimposed on the image displayed on display 330 to show the path over which the trailer is to be directed. It may be that an end position and orientation 220 is capable of being displayed and manipulated by operation of the knob 40. In any event, when the user is satisfied with the end position or direction identified on the screen 330, movement of the vehicle is initiated. The system controls the steering unit 350 of the vehicle 100 in order to achieve the direction and/or end position computed.

With the wireless embodiment shown in FIG. 3, initiation of movement of the vehicle may be achieved by pressing buttons 42 on the demountable switch 40. In this event, previously, the vehicle may have been placed in reverse gear and it has, in this event, an automatic gearbox, so that manual operation of a clutch is not required. Once control is switched to the tow-assist system (either by actuation of a button 42 or by some other in car switch), a vehicle brake is automatically applied and the driver can, if desired, exit the vehicle. Then, once the driver is ready (whether in the driving seat or outside the vehicle) an appropriate button 42 may be actuated to release the brake.

However, in a slightly different second tow-assist mode of operation, rather than display a desired end position on the screen 330, the camera 320 and screen 330 can be dispensed with. Instead operation of the knob 40 is employed by the driver (again whether seated in the vehicle or outside it) as if the trailer wheels 240 were steerable and as if, for instance, that rotation of the knob 40 in the direction of the arrow B would achieve steering of the trailer in the direction of the arrow A. The computing means 310 interprets the steering instructions input to the knob 40, and steers the steerable wheels (the wheels 250) at the front end of the vehicle 100 to achieve the desired course. Moreover, the computing system constantly recalculates required steering movements of the wheels 250 dependent on the steering movements input to the knob 40.

While the demountable switch 10, 10' has been described above in relation to its primary intended application for tow-assist input, it is feasible that the knob 40 may be multi-modal and useful for controlling other elements of the vehicle 100 also.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Further aspects and embodiments of the present invention are set out in the following numbered paragraphs:

1. A vehicle comprising a docking port and a selectively demountable switch having a body and a rotary knob on the body, and an interface between the switch and the docking port to enable commands entered by operation of the rotary knob to be communicated to the vehicle.
2. A vehicle as defined in paragraph 1, wherein the docking port physically restrains the switch body when docked with the docking port.
3. A vehicle as defined in paragraph 1, wherein the docking port comprises a cup holder.
4. A vehicle as defined in paragraph 3, wherein the cup holder is disposed in a centre console of the vehicle, which console is disposed between a driver's seat and a front passenger seat of the vehicle.
5. A vehicle as defined in paragraph 1, wherein the interface comprises a physical coupling of a plug and socket.
6. A vehicle as defined in paragraph 5, wherein the demountable switch and docking port are arranged so that interengagement between the plug and socket is effected by a docking operation comprising a two-part movement, a first insertion step and a second and subsequent engagement step, wherein, during the insertion step, the switch is moved into a docking position between said switch and port and, during the engagement step, an element of the switch or port is actuated to lock the switch in the port and also to mutually engage said plug and socket.
7. A vehicle as defined in paragraph 6, wherein said engagement of the plug and socket is completed by a magnetic connection between the plug and socket that corrects a degree of misalignment between said plug and socket after performance of said insertion step, and/or a signal indicates successful docking of the switch with the docking port, for example, illumination of or around the rotary knob.
8. A vehicle as defined in paragraph 1, wherein the interface is a wireless coupling, and optionally wherein, when docked, the docking port provides electrical power to the switch wirelessly.
9. A vehicle as defined in paragraph 8, wherein said docking is remotely effected, not requiring physical proximity between the switch and docking port, and the switch is independently powered and communicates with the docking port using acoustic or electromagnetic communication, for example infrared.
10. A vehicle as defined in paragraph 1, wherein the switch provides an input interface to a tow-assist system of the vehicle, which vehicle has positive power-assisted steering, whereby operation of the rotary knob provides the tow-assist system with desired direction indications of a trailer connected to the vehicle during reversing of the vehicle and the tow-assist system controls steering of the vehicle.

11. A vehicle according to paragraph 10, further comprising a camera arranged in use to capture an image rearward of said vehicle and a display operable in use to overlay on a captured image displayed on the display a desired trajectory, direction and/or position indication of a trailer connected to the vehicle during reversing of the vehicle.

12. A method of reversing a vehicle as defined in paragraph 10, comprising using the rotary knob as a substitute steering wheel to steer the trailer in a desired direction whilst reversing the vehicle, wherein the tow-assist system interprets rotational movements of the knob as if they were commands to steer the trailer in the direction of rotation of the rotary knob and effects steering movements of the vehicle's steerable wheels by actuating the positive power-assisted steering to achieve the desired direction of movement of the trailer.

13. A method as defined in paragraph 12, wherein the interface between the switch and the docking port is a wireless coupling, wherein said docking is remotely effected, not requiring physical proximity between the switch and docking port, and the switch is independently powered and communicates with the docking port using acoustic or electromagnetic communication, and wherein the vehicle has an automatic gearbox, the method including the step of selecting reverse gear and switching steering control to the demountable switch, the switch further comprising means to instruct at least "Go" and "Stop" modes of the vehicle.

14. A tow-assist system for a vehicle arranged to tow a trailer, the vehicle being of the type having a positive power-assisted steering mechanism, the system comprising computing means and a demountable switch having a body, a rotary knob on the body and an interface for the communication with the computing means, wherein the computing means is arranged to interpret rotational movement of the knob on the body as desired steering movements of the trailer when the vehicle is being reversed and to effect steering commands for the positive power assisted steering mechanism to achieve said desired steering movements of the trailer.

15. A tow-assist system as defined in paragraph 14, further comprising a camera and a display to display the image captured by the camera, wherein the camera is intended for disposition on the vehicle or trailer to view rearwardly and to display on the image indications of the route the trailer will follow with a current steering input to the rotary knob.

16. A tow-assist system as defined in paragraph 14, wherein the body is shaped to fit a cup-holder of a vehicle for which it is intended and comprises plug and socket interface for engagement with a corresponding plug and socket interface in the vehicle.

17. A demountable switch for a tow-assist system of a vehicle, comprising a body, a rotary knob on the body, and a selectively engageable interface to enable commands entered by operation of the rotary knob to be communicated to a vehicle having a corresponding interface.

18. A demountable switch as defined in paragraph 17, wherein the body is cup-shaped. A demountable switch as defined in paragraph 17, wherein the interface of the switch comprises a plug adapted to be deployed by movement of an element of the switch to engage said plug with a corresponding socket of a vehicle.

The invention claimed is:
1. A vehicle, comprising:
a docking port comprising a cup holder; and
a selectively demountable switch having a body and a rotary knob on the body,
an interface between the switch and the docking port that allows commands entered by operation of the rotary knob to be communicated to the vehicle, the interface comprising a plug or a socket arranged to couple with a corresponding socket or plug in the docking port,
wherein the docking port is arranged to restrain the switch body when the switch is docked with the docking port by inserting the switch body in the cup holder,
wherein the switch provides an input interface to a tow-assist system of the vehicle, and
wherein operation of the rotary knob provides the tow-assist system with desired direction indications of a trailer connected to the vehicle during reversing of the vehicle so that the tow-assist system can control steering of the vehicle,
wherein the demountable switch and docking port are arranged so that engagement of the plug and socket is effected by a docking operation comprising a two-part movement, a first insertion step and a second and subsequent engagement step, wherein, during the insertion step, the switch is moved into a docking position in the port and, during the engagement step, an element of the switch or port comprising the plug or socket is actuated to move relative to the switch body, thereby to lock the switch in the port and also to mutually engage the plug and socket.

2. The vehicle of claim 1, wherein the cup holder is provided with a socket that connects to a wiring loom of the vehicle.

3. The vehicle of claim 2, wherein the cup holder is disposed in a center console located between a driver's seat and a front passenger seat of the vehicle.

4. The vehicle of claim 1, wherein the engagement of the plug and socket is completed by a magnetic connection between the plug and socket that corrects a degree of misalignment between the plug and socket after performance of the insertion step, and/or a signal indicates successful docking of the switch with the docking port.

5. The vehicle of claim 1, wherein the interface between the switch and the docking port is a wireless coupling, and when the switch is docked with the docking port, the docking port provides electrical power to the switch wirelessly.

6. The vehicle of claim 1, further comprising a camera arranged to capture an image rearward of the vehicle and a display operable to overlay on a captured image displayed on the display a desired trajectory, direction and/or position indication of a trailer connected to the vehicle during reversing of the vehicle.

7. A method of reversing the vehicle of claim 1, comprising using the rotary knob as a substitute steering wheel to steer the trailer in a desired direction whilst reversing the vehicle, wherein the tow-assist system interprets rotational movements of the knob and effects steering movements of steerable wheels of the vehicle by actuating a positive power-assisted steering system of the vehicle to achieve the desired direction of movement of the trailer.

8. The vehicle of claim 1, wherein the body is cup-shaped.

9. A tow-assist system for a vehicle arranged to tow a trailer, the vehicle having a positive power-assisted steering mechanism, the system comprising:
- a computer;
- a demountable switch having a body, a rotary knob on the body and an interface for communicating with the computer; and
- a docking port comprising a cup holder and arranged to restrain the switch body when the switch is docked with the docking port by inserting the switch body in the cup holder;
- wherein the interface for communicating with the computer comprises a plug or socket arranged to couple with a corresponding socket or plug in the docking port, and
- wherein the computer interprets rotational movement of the knob on the body as desired steering movements of the trailer when the vehicle is being reversed and provides steering commands to the positive power assisted steering mechanism to achieve the desired steering movements of the trailer,
- wherein the demountable switch and docking port are arranged so that engagement of the plug and socket is effected by a docking operation comprising a two-part movement, a first insertion step and a second and subsequent engagement step, wherein, during the insertion step, the switch is moved into a docking position in the port and, during the engagement step, an element of the switch or port comprising the plug or socket is actuated to move relative to the switch body, thereby to lock the switch in the port and also to mutually engage the plug and socket.

10. The tow-assist system of claim 9, further comprising a camera and a display to display an image captured by the camera, wherein the camera is configured to display on the image indications of a route the trailer will follow with a current steering input to the rotary knob.

11. A vehicle, comprising:
- a positive power-assisted steering mechanism; and
- a tow-assist system, the tow-assist system comprising:
    - a computer;
    - a demountable switch having a body, a rotary knob on the body and an interface for communicating with the computer; and
    - a docking port comprising a cup holder and arranged to restrain the switch body when the switch is docked with the docking port by inserting the switch in the cup holder;
    - wherein the interface for communicating with the computer comprises a plug or socket arranged to couple with a corresponding socket or plug in the docking port, and
    - wherein the computer interprets rotational movement of the knob on the body as desired steering movements of the trailer when the vehicle is being reversed and provides steering commands to the positive power assisted steering mechanism to achieve the desired steering movements of the trailer,
- wherein the demountable switch and docking port are arranged so that engagement of the plug and socket is effected by a docking operation comprising a two-part movement, a first insertion step and a second and subsequent engagement step, wherein, during the insertion step, the switch is moved into a docking position in the port and, during the engagement step, an element of the switch or port comprising the plug or socket is actuated to move relative to the switch body, thereby to lock the switch in the port and also to mutually engage the plug and socket.

12. The vehicle of claim 8, wherein the cup-shaped body is provided with grooves and the cup holder is provided with ridges, and wherein the grooves are adapted to mate with the ridges.

* * * * *